(12) United States Patent
Plug

(10) Patent No.: US 6,652,955 B1  
(45) Date of Patent: Nov. 25, 2003

(54) HOT-MOLDABLE LAMINATED SHEET

(75) Inventor: Johannes Petrus Marinus Plug, Stevensweert (NL)

(73) Assignee: Trespa International B.V., Weert (NL)

( * ) Notice: Subject to any disclaimer, the term of this patent is extended or adjusted under 35 U.S.C. 154(b) by 132 days.

(21) Appl. No.: 09/643,175

(22) Filed: Aug. 21, 2000

(30) Foreign Application Priority Data

Aug. 31, 1999 (DE) .......................................... 199 41 300

(51) Int. Cl.⁷ .............................................. B32B 23/02
(52) U.S. Cl. .................... 428/192; 428/161; 428/292.1; 428/354; 428/541; 428/542.6; 428/913.3; 428/326; 428/535; 428/220
(58) Field of Search ............................ 428/292.1, 192, 428/195, 542.6, 542.2, 913.3, 541, 354, 161, 326, 537.1, 220, 535, 327, 407, 526, 141

(56) References Cited

U.S. PATENT DOCUMENTS

| | | | |
|---|---|---|---|
| 2,648,370 A | | 8/1953 | Beach |
| 3,940,528 A | * | 2/1976 | Roberts ....................... 428/161 |
| 4,268,565 A | * | 5/1981 | Luck et al. .................. 428/161 |
| 4,503,115 A | | 3/1985 | Hemes et al. |
| 4,570,410 A | | 2/1986 | Tuneke et al. |
| 4,625,491 A | * | 12/1986 | Gibson ......................... 52/794 |
| 5,681,652 A | * | 10/1997 | Cope ......................... 428/318.8 |
| 5,938,881 A | * | 8/1999 | Kawata et al. ........... 156/307.4 |

FOREIGN PATENT DOCUMENTS

| | | |
|---|---|---|
| DE | B 2823 669 | 5/1978 |
| EP | 0 031 316 A1 | 7/1981 |
| EP | B 081 147 | 6/1987 |
| GB | B 1 600 469 | 5/1978 |

* cited by examiner

Primary Examiner—Merrick Dixon  
(74) Attorney, Agent, or Firm—ProPat, L.L.C.

(57) ABSTRACT

A hot-moldable laminated sheet has a core, made from a prefabricated flat sheet of wood and/or cellulose fibers which have been impregnated with heat-curable phenol/formaldehyde resin. The flat sheet being thickened in the opposite edge regions. The two surfaces of the core are provided with decorative layers.

13 Claims, 2 Drawing Sheets

$\alpha = 30° - 60°$

HOT-MOLDABLE LAMINATED SHEET

BACKGROUND OF THE INVENTION

1. Field of the Invention

The invention relates to a hot-moldable laminated sheet which is composed of a core and parts hot-pressed with said core and has a decorative layer on one or both surfaces of the core and of the parts bonded thereto, and a process for the production of a hot-moldable laminated sheet.

2. Description of the Related Art

For the interior finish in kitchens and bathrooms, the cladding of facades of buildings and the furnishing of chemical and physical laboratories, sheets which have rounded edges and a curved shape are produced. These sheets frequently have a decorative surface, and the starting materials are support layers which are adhesively bonded to one another.

Thus, British Patent 1 600 469 (corresponds to German Patent 2 823 669) discloses a process in which the sheet is heated to such an extent that the support layers or the groups of layers which consist of a plurality of support layers bonded to one another, which layers or groups are bonded to one another by means of a thermoplastic bonder, are displaced relative to one another in the direction of the sheet surface during molding in the heated molding region, and that in each case separation of the binder joint is prevented by mold retaining elements of the bending means during or after the molding or only after the molding, at least until the binder has solidified again as a result of cooling.

This gives a laminated synthetic resin sheet which comprises a plurality of support layers hot-pressed with one another and impregnated with thermosetting binders and can be molded at a molding temperature which is higher than the hot-pressing temperature. Between the support layers or between groups of layers consisting in each case of a plurality of support layers bonded to one another are layers of a thermoplastic binder whose melting point is the same as or lower than the molding temperature.

U.S. Pat. No. 4,503,115 (corresponds to European Patent 0 081 147) describes a decorative structural sheet which is suitable for outdoor applications and comprises a pressed core of fibers which are surrounded by heat-cured phenol/formaldehyde resin and has a decorative layer on one or both surfaces of the core. The core comprises wood fibers and/or cellulose fibers having a maximum length of 20 mm, which are coated with a heat-curable phenol/formaldehyde resin in aqueous solution or dispersion. One embodiment of this structural sheet is produced by a procedure in which one or more mechanically precompacted layers arranged one on top of the other and based on wood particles which are impregnated with the heat-curable phenol/formaldehyde resin are hot-pressed with formation of the core of the structural sheet, with the result that the synthetic resin is cured. The surfaces of the core are provided with one or two decorative layers. The wood fibers impregnated with the resin solution or resin dispersion are dried to a residual moisture content of from 2 to 15% by weight, the resin partially curing. The dried fibers are entangled to form a web-like mat, which is mechanically precompacted and then heated and pressed in one or more layers arranged one on top of the other, under resin-curing conditions. The decorative layers are applied to the precompacted mat or, after pressing, to the core layer.

Such hot-molded decorative high-pressure laminated sheets (HPL) are so-called compact moldings whose structure either corresponds to that of compact sheets according to EN 438-1 or DIN 16926 or ISO 4586 or is similar to such a structure. Components or layers of such compact sheets consist of the same material and are produced in the same high-pressure presses as other sheets based on curable resin and, depending on the molding process, may from case to case contain adhesive layers. Compact moldings are self-supporting elements having stable rounded edges and, like compact sheets, have a decorative coloring on one or both sides, with a smooth or structured surface, and generally have closed cut edges.

Processes in which melamine resin-impregnated decorative webs and phenol resin-impregnated core paper webs in S-shaped or L-shaped structures of defined dimensions are cured under heat and high pressure are also known. In another known process, the thickness of the compact sheets is limited on one side in regions where bending is to be performed, by inserting separating strips during the production, the thickness depending on the desired bending radius. In the thinner regions of the sheet, subsequent shaping in stationary bending units under heat is then possible. After cooling in a clamping apparatus, the parts remain shaped, the mechanical strength of the round region being determined by the remaining wall thickness.

In a further known process, the compact sheet is milled on one side in the regions to be molded, down to a small wall thickness which is dependent on the desired bending radius, and is shaped in stationary bending units under heat. The milled-out cavities are filled with curable synthetic resins or strengthened by inserting fitting pieces in the clamping apparatus.

The production of moldings from compact sheets and a subsequently bonded HPL compact sheet is effected in a further known process by milling the compact sheet prior to bonding in the area subsequently to be molded or filling said area with a spacer strip. Another possibility comprises joining two compact sheets as a support at the intended angle and milling one of the edges to form a convex rounded edge. The HPL compact sheet is then adhesively bonded to this milled surface. Concave rounded edges can be produced by milling the back and removing the spacer strip.

In the production of compact moldings from single HPL layers, these single layers in thicknesses of up to 1 mm are laminated with core sheets ground on both sides, to give sheet packets of the desired thickness, and then bonded together in clamping molds with, for example, solvent-free, two-component adhesives. The adhesive bonding of the nonabsorptive single HPL layers to give tight joints sets high requirements with respect to the two-component adhesives. The laminated sheet packets are then bent in the desired manner in a bending apparatus.

The known processes in which the material is milled in the molding region and the cavities in the covering are filled with synthetic resin casting compound or strengthened by inserting fitting pieces in the clamping apparatus are expensive owing to the large number of processing steps, such as milling, bending, filling or production of fitting pieces and reworking, and the product quality is unsatisfactory since, for example, cylindrical shapes are often irregular, hairline cracks often occur at the ends of elements and the material can only be used as an element which is decorative on one side. In the case of molding in a molding press, the product quality is good but the dies for the molding are very expensive and, owing their poor flexibility, cannot be used for different shapes.

The moldability of uncured layers of HPL compact sheets which have been laminated together to give a sheet, the outside of such a sheet being provided with melamine or acrylic resin top layers, is limited by the small extensibility of the decorative top layers.

SUMMARY OF THE INVENTION

It is the object of the invention further to develop a sheet of the type described at the outset in such a way that, without performing molding work, a sheet which is thicker and rounded in the edge regions and has constant density and a decorative layer or layers substantially free of hairline cracks, fissures and similar defects is obtained.

This object is achieved, according to the invention, if a prefabricated flat sheet of wood and/or cellulose fibers, which have been impregnated with heat-cured phenol/formaldehyde resin, is provided as the core and if the sheet is thickened along one or more of its edge regions with the material of which the prefabricated sheet consists.

The prefabricated sheet is disclosed, for example, in the abovementioned U.S. Pat. No. 4,503,115 (corresponds to European Patent 0 081 147) and, depending on the desired thickness, consists of one or more flat, rectangular sheets which are composed of wood and/or cellulose fibers which have been impregnated with heat-curable phenol/formaldehyde resin. A plurality of mechanically precompacted layers arranged one on top of the other are pressed together with application of heat. The flat sheet prefabricated in this manner is also referred to as a prepreg. In a further development of the invention, the material comprises prefabricated strips which have a rectangular cross-section, a rectangle-like cross-section having an arc-shaped cross-sectional side or a trapezoidal cross-section having an oblique side. Expediently, the strips terminate at edges of the prefabricated flat sheet, and the arc-shaped cross-sectional side of the strips or the oblique side of the strips is directed away from the edges toward the interior of the sheet. It is also possible for the arc-shaped cross-sectional side or the oblique side to be directed toward the edge of the sheet.

In a further embodiment of the laminated sheet, the material for thickening the edge regions comprises loose wood or cellulose fibers which are impregnated with resin and fill one or more cavities of a mold between which and a further mold the prefabricated flat sheet and the material together with one or two decorative layers is pressed to form the laminated sheet.

Within the scope of the invention, it is also intended to provide a process for the production of laminated sheets which manages with a very small number of process steps. This object is achieved, according to the process, by inserting a prefabricated sheet of wood and/or cellulose fibers into an opened press which contains a mold equipped with one or more cavities and a smooth mold, arranging the material of which the sheet is made along at least one of the edge regions of the sheet, applying one or two decorative layers to the surface(s) of the sheet combined with the material and hot-pressing all parts present between the molds.

In one embodiment of the process, at least one strip produced from the same material as the sheet is applied as material along one of the edge regions of the sheet.

In another embodiment of the process, one or more cavities of the mold is or are filled with the wood and/or cellulose fiber material of which the prefabricated sheet consists and one or two decorative layers are applied to the surface(s) of the sheet combined with the wood and/or cellulose fiber material in the cavity or cavities and pressed together with heat and pressure between the molds. According to the process, the parts are pressed together between the molds at a temperature of 130 to 180° C. and at a pressure of 60 to 110 bar.

The laminated sheet has the advantages that it has a uniform density and substantially homogeneous physical, chemical and technical properties and that, in the edge regions, the thickness and the shape of the thickened edge regions can be varied in a simple manner. Another advantage is that the laminated sheet can be produced using any conventional press, it being necessary in each case to replace only a single mold in order to obtain another embodiment of the laminated sheet.

Further objects, features and advantages of the present invention will become apparent from the detailed description that follows.

DETAILED DESCRIPTION OF THE PREFERRED EMBODIMENTS

Figure 1:
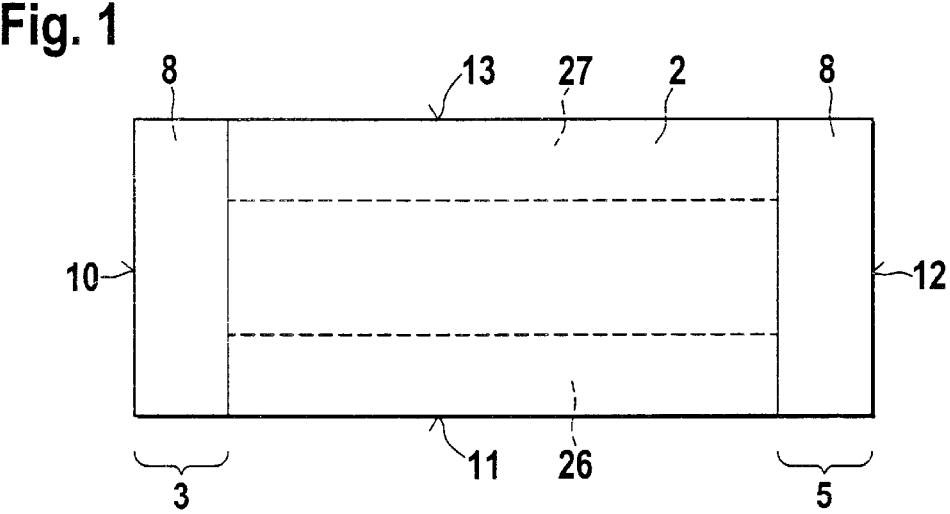
FIG. 1 shows a plan view of a prefabricated sheet as a core of a laminated sheet, having two strips placed along opposite edge regions of the sheet, FIG. 2 schematically shows a view of an opened press with inserted prefabricated sheet, decorative layers, and additional material for thickening the edge regions of the sheet, FIG. 3a) shows a cross-section of a laminated sheet having two opposite thickened edge regions, FIG. 3b) shows a plan view of a laminated sheet having four thickened edge regions.

A prefabricated flat sheet 2 shown in plan view in FIG. 1 is covered in its opposite end regions 3 and 5 with strips 8, 8 which are oriented along the edges 10, 12 of the sheet 2. The sheet 2 and the strips 8, 8 form the core of a laminated sheet 1, as shown in cross-section in FIG. 3a. In this embodiment, edge regions 26, 27 indicated by dashed lines are not provided with strips.

The sheet 2 is prefabricated, for example, from support layers consisting of wood and/or cellulose fiber particles by the process described in EP-B-0 081 147, with omission of decorative layers. This is effected by pressing, with application of heat, one or more mechanically precompacted layers arranged one on top of the other and based on wood and/or cellulose fiber particles which have been impregnated with a heat-curable phenol/formaldehyde resin, the synthetic resin being cured. For this purpose, wood fibers and/or cellulose fibers having a maximum length of 20 mm are coated or impregnated with more than 15 and up to 90% by weight of the heat-curable phenol/formaldehyde resin, based on the fiber weight, in aqueous solution or dispersion. The fibers are dried to a residual moisture content of from 2 to 15% by weight, the resin being partially cured and the dried fibers being entangled to form a web-like mat. The mat is mechanically precompacted and then heated and pressed in one or more layers arranged one on top of the other, under resin-curing conditions. The mats generally already have the desired sheet format; otherwise, the sheets having the required dimensions are produced from the mats. The strips 8, 8 consist of the same material as the prefabricated sheet 2.

Figure 2:
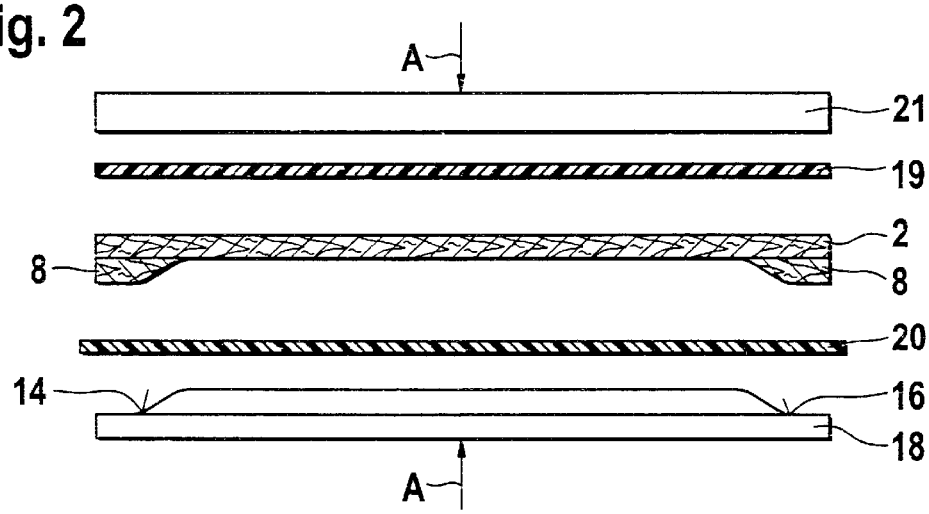

FIG. 2 schematically shows a view of an opened press which has two molds 18 and 21. The mold 18 is in the form of a matrix which, depending on requirements, has one to four cavities 14, 15, 16, 17 which are arranged along the edge regions of the mold 18. In the present case, the molding 18 is equipped with two cavities 14, 16 opposite one another. The further mold 21 is a smooth press plate which has neither cavities nor protuberances. Two decorative layers 19, 20 are arranged between the opened molds 18, 21, between which decorative layers the prefabricated sheet 2 with the applied strips 8, 8 is present. The molds 18, 21 are brought together in the direction indicated by the arrows A, A, and the decorative layers 18, 20 and the prefabricated sheet 2 having the strips 8 are pressed together with heat application and correspondingly high pressure. Expediently, the decorative layer 20 which is the lower one in FIG. 2 is slightly longer than the upper decorative layer 19 since the lower decorative layer 20 has to cover a larger surface than the upper decorative layer 19. The larger surface results from the thickened edge regions of one surface of the laminate comprising the prefabricated sheet 2 and the strips 8. The strips 8 have substantially the same contour as the cavities 14 and 16 of the molding 18.

Figure 3A:
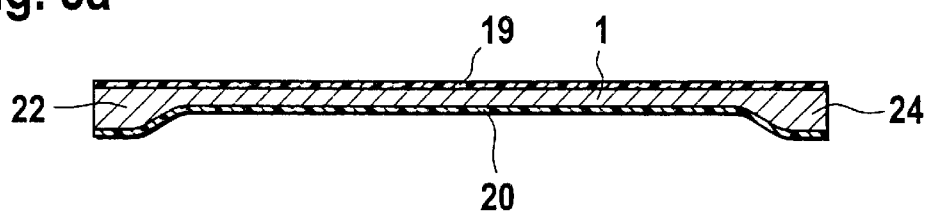

FIG. 3a shows, in cross-section, a finished laminated sheet 1 which has two thickened edge regions 22 and 24 which are opposite one another. The laminated sheet 1 is equipped on both sides with decorative layers 19 and 20. It is of course also possible to apply only one decorative layer if this is desired, i.e. either the decorative layer 19 alone or the decorative layer 20 alone can then be arranged between the mold in the pressing process.

Figure 3B:
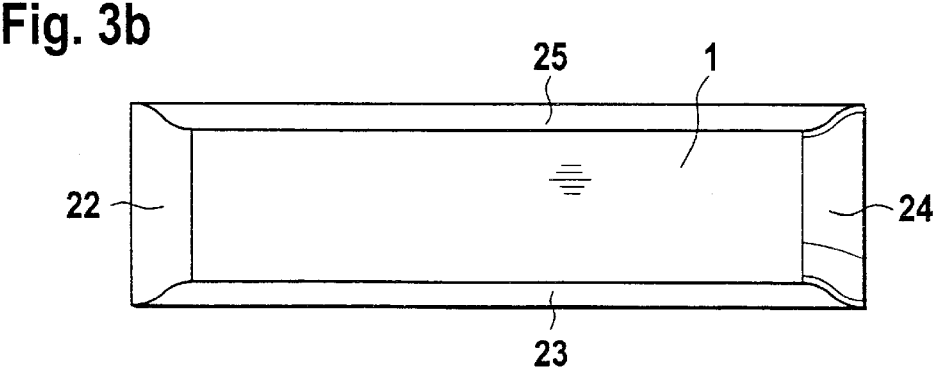

A laminated sheet 1 having four thickened edge regions 22, 23, 24 and 25 is shown in FIG. 3b. For the production of this laminated sheet, a mold 18 as shown in FIG. 6c is used in the pressing process. The molds according to FIGS. 6a and 6b and strips 4, 7 and 8 in one or three edge regions of the sheet 2 are used to produce laminated sheets which are thickened in one edge region 22 or in three edge regions 22, 23, 24.

Figure 4A:
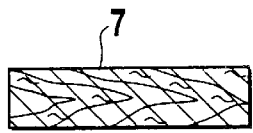
FIGS. 4a, 4b and 4c show cross-sections of three embodiments of strips, FIG. 5 schematically shows two cavities of a mold which are filled with wood and/or cellulose fibers and FIGS. 6a, 6b, 6c each show a mold having one, three and four cavities in perspective view.
Figure 4B:
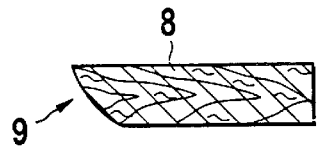
Figure 4C:
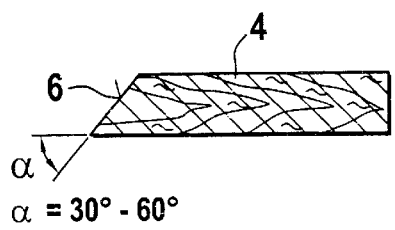
Figure 5:
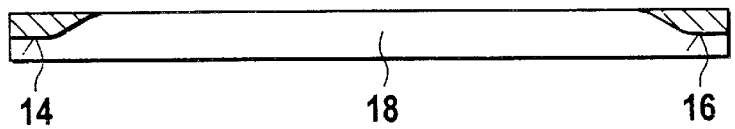

FIGS. 4a to 4c show three different embodiments of strips 7, 8 and 4. The strip 7 according to FIG. 4a has a rectangular cross-section and, where such a strip is to be hot-pressed with the prefabricated flat sheet 2, the mold 18 is designed in such a way that the cavities have a rectangular cross-section. FIG. 4b shows the preferred embodiment of the strip 8, which has a rectangle-like cross-section, only one cross-sectional side 9 being arc-shaped. The strip 4 according to FIG. 4c has a trapezoid-like cross-section with an oblique side 6 which makes an angle α of from 20 to 70°, preferably from 30 to 60°, in particular 45°, with the base surface. The strips 4, 7, 8 are always arranged on the prefabricated sheet 2 in such a way that they terminate at the edges 10, 11, 12, 13 of the sheet 2, the arc-like cross-sectional side 9 being directed away from the edges toward the interior of the sheet 2 when strip 8 is used. If required, the strips 8 can also be rotated through 180° relative to this position before being bonded to the flat prefabricated sheet 2. All that is necessary then is for the cavity orientation in the mold accordingly also to be rotated through 180°. In addition to the embodiments of the strips 7, 8, 4, shown in FIGS. 4a to 4c, other cross-sectional shapes which any person skilled in the art can design himself if required are also possible. Thus, for example, it is possible for the strips to have two arc-like cross-sectional sides, it being possible for the arc-like curve to be parabolic, elliptical or circular. Instead of prefabricated strips, loose wood and/or cellulose fibers as shown in FIG. 5, which are mechanically compacted and filled into one or more of the cavities 14 to 17 of the mold 18, can be used as material for thickening the edge regions of the sheet 2. These wood and/or cellulose fibers have been impregnated with phenol/formaldehyde resin and have the same constitution as the fibers used for the production of the prefabricated sheet 2. A laminated sheet 1 is produced by first inserting only the prefabricated flat sheet 2 into the open press, closing the press briefly and applying heat and pressure until the loose fibers in the cavities of the mold 18 are firmly bonded to the prefabricated sheet 2. Thereafter, the press is opened and, depending on requirements, one or two decorative layers are applied to the surface(s) of the sheet 2 having the thickened edge regions. The press is then closed again and the hot pressing is continued until an appropriate laminated sheet 1, as shown in FIG. 3, has been produced.

The laminated sheet 1 has a uniform density in the range from 1.1 to 1.5 g/cm$^3$, in particular of 1.4 g/cm$^3$, over its total cross-section, i.e. also including its thickened edge regions. Laminated sheets having thicknesses of from 2 to 30 mm, in particular from 2 to 20 mm, in the unthickened edge region and from 4 to 40 mm, in particular from 4 to 30 mm, in the thickened edge region are produced. Both the density and the physical and technical properties of the laminated sheet 1 are substantially uniform over the unthickened and thickened region of the laminated sheet 1.

The decorative layers 19, 20 consist of a plastics, paper or wood sheet and/or lacquer coat and have a basis weight of from 60 to 420 g/m$^2$, in particular from 140 to 300 g/m$^2$. Furthermore, the decorative layers 19, 20 may consist of crosslinked acrylic, urethane, epoxy or melamine resin, it being possible for the acrylic resin to be pigmented. It is also possible for fillers and/or dyes to be added to the resin. In a further embodiment, the decorative layers 19, 20 comprise decorative papers which have been impregnated with melamine resin. Particularly in the case of structural sheets, but also in the case of sheets for interior finishing and for use in laboratories, the phenol/formaldehyde resin used for impregnating the wood and/or cellulose fibers contains a flame retardant additive.

The molds 18, 21 are subjected to a pressure of from 60 to 110 bar, in particular 90 bar, and heated to a temperature in the range from 130 to 180° C.

Figure 6A:
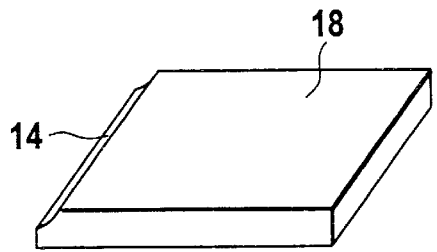
Figure 6B:
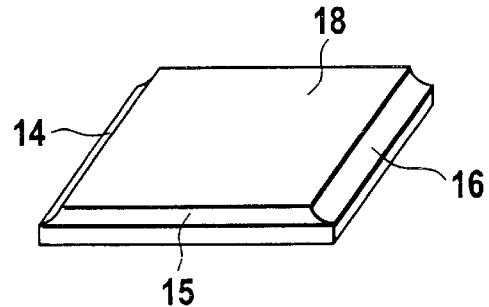
Figure 6C:
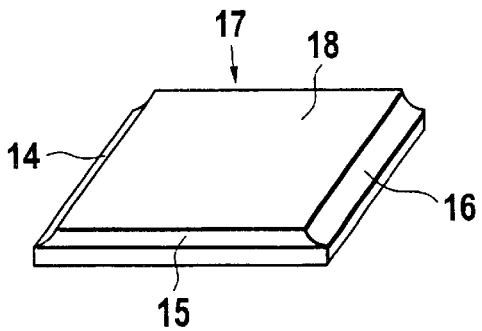

FIGS. 6a, 6b and 6c show various embodiments of the mold 18. The embodiment 18 according to FIG. 6a has a single cavity 14, while the embodiment according to FIG. 6b has three cavities 14, 15 and 16. FIG. 6c shows a mold 18 which has four cavities 14, 15, 16 and 17, each of which extend along the edge regions of the mold 18. Further embodiments of the mold 18 can of course readily be designed by a person skilled in the art and permit the formation of correspondingly structured surfaces for the laminated sheet 1.

What is claimed is:

1. A hot-moldable laminated sheet comprising a core made of a prefabricated flat sheet and a material located along at least one edge of said flat sheet and a decorative layer on one or both surfaces of said flat sheet and of the material bonded thereon, wherein said flat sheet is prefabricated of wood and/or cellulose fibers, which have been impregnated with heat-cured phenol/formaldehyde resin, wherein said material is directly located on an unthickened region of said prefabricated flat sheet, whereby the thickened region is thickened along one or more of the sheet's edges with said material, which is the same material as the prefabricated sheet is made of, and wherein the hot-moldable laminated sheet has uniform density over the unthickened and the thickened region of the sheet.

2. The laminated sheet as claimed in claim 1, wherein the material comprises prefabricated strips having a rectangular cross-section, and being arranged along edges of the prefabricated flat sheet.

3. The laminated sheet as claimed in claim 1, wherein the material comprises prefabricated strips having a rectangle-like cross-section with one arc-like cross-sectional side, and being arranged along edges of the prefabricated flat sheet.

4. The laminated sheet as claimed in claim 1, wherein the material comprises prefabricated strips which have a trapezoidal cross-section with one oblique side which includes an angle α of from 20 to 70°, in particular of 45°, with the base surface of said prefabricated strip, and wherein the prefabricated strips are arranged along edges of the prefabricated flat sheet.

5. The laminated sheet as claimed in any of claims 2 to 4, wherein said strips are arranged along edges of said prefabricated flat sheet and are obliged with the edges of said prefabricated flat sheet and wherein said arc-like cross-sectional side of the strips or said oblique side of said strips is directed away from the edges toward the interior of said prefabricated flat sheet.

6. The laminated sheet as claimed in claim 1, wherein said material for thickening regions of the edges of said prefabricated flat sheet comprises loose wood and/or cellulose fibers which are impregnated with resin and fill one or more cavities of a mold, between said mold and a further mold said sheet and said material together with one or two decorative layers are inserted and are pressed to form the laminated sheet.

7. The laminated sheet as claimed in any of claims 1 to 6, wherein one edge region, two opposite edge regions or three or all four edge regions of the laminated sheet are thickened.

8. The laminated sheet as claimed in claim 1, wherein said sheet has a uniform density in the range from 1.1 to 1.5 g/cm$^3$, in particular 1.4 g/cm$^3$, over its total cross-section, including its thickened edge regions.

9. The laminated sheet as claimed in claim 1, wherein the thickness of the sheet is from 2 to 30 mm in a non-thickened edge region and from 4 to 40 mm in the thickened edge region.

10. The laminated sheet as claimed in claim 1, wherein the phenol/formaldehyde resin contains a flame-retardant additive.

11. The laminated sheet as claimed in claim 1, wherein said decorative layers comprise a plastics, paper or wood sheet and/or a lacquer layer and have a basis weight of from 60 to 420 g/m$^2$, in particular from 140 to 300 g/m$^2$.

12. The laminated sheet as claimed in claim 11, wherein the decorative layer(s) comprise(s) a crosslinked acrylic, urethane, epoxy or melamine resin, wherein the acrylic resin is pigmented and wherein fillers and/or dyes have been added to the acrylic, urethane, epoxy or melamine resin.

13. The laminated sheet as claimed in claim 1, wherein the decorative layer(s) comprise(s) decorative papers which have been impregnated with melamine resin.

\* \* \* \* \*